Patented Dec. 4, 1928.

1,693,923

UNITED STATES PATENT OFFICE.

ARTHUR J. HESS, OF DETROIT, MICHIGAN, ASSIGNOR TO EARL HOLLEY, OF DETROIT, MICHIGAN.

COATING FOR MOLDS.

No Drawing.  Application filed December 11, 1926. Serial No. 154,308.

The object of this invention is to make an improved coating for metal molds, and specifically to make an improved coating wash specifically adapted for use with cast iron molds in which iron castings are to be made, and also adapted for other metals having a relatively high melting point.

The coating wash I use consists of a powdered refractory suspended in kerosene, mixed with a dilute solution of sodium silicate.

The specific formula which I use is as follows:—43.8% graphite, 34.45% silica, 16% water, and the balance, iron as an impurity.

I take 1½ parts of this by volume and thoroughly mix with 6 parts of kerosene. I then take "C" grade sodium silicate solution and dilute 6 times with water. That is to say, I increase the volume 7 times the volume of the sodium silicate as sold. I then take 1 volume of this dilute solution of sodium silicate and thoroughly mix it with 2 parts of the suspension of graphite and sodium silicate in kerosene already prepared.

*Operation.*—I heat the cast iron mold sufficiently high that upon applying the wash the water is evaporated and the major portion of the kerosene is driven off as hydrocarbon vapor.

In actual operation it is my belief that the kerosene acts as a carrier for the particles of graphite and silica flour, and carries these into the interstices of the gray iron, which is a porous metal, where the kerosene in evaporating deposits not only these particles, but also carbon formed by decomposition of the kerosene.

Meanwhile the dilute solution of sodium silicate has been dehydrated and deposits the colloidal silica on the surface of the mold, and thus produces a very adherent coating, and I have found that it makes quite a smooth coating to which castings will not adhere and which is not easily eroded by the molten metal.

This coating is to be used as a substitute for the Meloche coating described in Patent No. 1,453,593, and is to be used in conjunction with the Meloche process described in Patent No. 1,536,905.

Following this process, a thick coating of lampblack is applied, being superimposed on the coating herein described. I have found that with this coating the lampblack does not pack down and is easily removed after each casting is made, so that a fresh coating of lampblack can be applied after each casting, which is one of the steps of the above process.

What I claim is:—

1. A wash for protecting metal molds, comprising a mixture of a suspension of graphite and silica in kerosene mixed with a dilute solution of sodium silicate in water.

2. A wash for protecting metal molds, comprising a mixture of two parts of a suspension of graphite and silica in kerosene mixed with one part of a dilute solution of sodium silicate in water.

In testimony whereof I affix my signature.

ARTHUR J. HESS.